United States Patent
Kunii et al.

(10) Patent No.: US 10,106,030 B2
(45) Date of Patent: Oct. 23, 2018

(54) ARRANGEMENT STRUCTURE OF CANISTER IN VEHICLE

(71) Applicant: MITSUBISHI JIDOSHA KOGYO KABUSHIKI KAISHA, Tokyo (JP)

(72) Inventors: Kenichi Kunii, Okazaki (JP); Takayuki Sano, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 14/920,390

(22) Filed: Oct. 22, 2015

(65) Prior Publication Data

US 2016/0114672 A1   Apr. 28, 2016

(30) Foreign Application Priority Data

Oct. 23, 2014   (JP) .................. 2014-216072

(51) Int. Cl.
| | |
|---|---|
| *B60K 15/03* | (2006.01) |
| *B60K 15/035* | (2006.01) |
| *B60K 1/04* | (2006.01) |
| *B60K 13/04* | (2006.01) |

(52) U.S. Cl.
CPC .......... *B60K 15/03504* (2013.01); *B60K 1/04* (2013.01); *B60K 13/04* (2013.01); *B60K 2001/0416* (2013.01); *B60K 2015/03514* (2013.01); *B60K 2015/03542* (2013.01)

(58) Field of Classification Search
CPC .............. B60K 15/03504; B60K 13/04; B60K 2015/03542; B60K 2015/03514; B60K 2001/0416; B60R 16/04
See application file for complete search history.

(56) References Cited

U.S. PATENT DOCUMENTS

| | | | | |
|---|---|---|---|---|
| 4,793,839 A * | 12/1988 | Hayashida | ......... | F02M 25/0854 123/519 |
| 5,687,697 A * | 11/1997 | Ishikawa | .......... | B60K 15/03504 123/520 |
| 5,702,125 A * | 12/1997 | Nakajima | ........ | B60K 15/03504 280/834 |
| 6,893,047 B2 * | 5/2005 | Chou | .................. | F02M 25/0854 180/69.4 |
| 7,688,582 B2 * | 3/2010 | Fukazu | .................... | B60K 1/04 180/65.1 |
| 7,872,206 B2 * | 1/2011 | Matsunaga | ............ | H01H 9/085 200/335 |

(Continued)

FOREIGN PATENT DOCUMENTS

JP   8-58404 A   3/1996

*Primary Examiner* — Tony H Winner
*Assistant Examiner* — Michael R Stabley
(74) *Attorney, Agent, or Firm* — Birch, Stewart, Kolasch & Birch, LLP

(57) ABSTRACT

In a vehicle in which a muffler are arranged below a rear floor panel configuring a floor of a rear portion of a vehicle interior and on a further rear side than rear wheels in a vehicle forward/backward direction, and a battery for auxiliary machines is arranged on the further rear side than the rear wheels in the vehicle forward/backward direction and is housed in a battery housing recessed portion, a canister is arranged between the muffler and the battery for auxiliary machines in a vehicle width direction.

17 Claims, 6 Drawing Sheets

(56) References Cited

U.S. PATENT DOCUMENTS

| | | | | |
|---|---|---|---|---|
| 7,913,788 B1* | 3/2011 | Bryer | ............... | B60K 1/04 |
| | | | | 180/68.5 |
| 8,343,263 B2* | 1/2013 | Murayama | ....... | B60K 15/03504 |
| | | | | 96/131 |
| 8,522,912 B2* | 9/2013 | Yamada | ............ | A01D 69/10 |
| | | | | 180/325 |
| 8,887,695 B2* | 11/2014 | Aso | ............ | F02M 25/0854 |
| | | | | 123/518 |
| 2011/0168461 A1* | 7/2011 | Meyer-Ebeling | ........ | B60K 1/04 |
| | | | | 180/65.1 |
| 2011/0297127 A1* | 12/2011 | Aso | ............ | F02M 25/0854 |
| | | | | 123/519 |

* cited by examiner

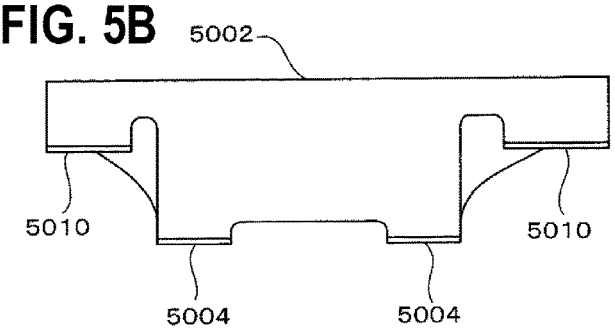
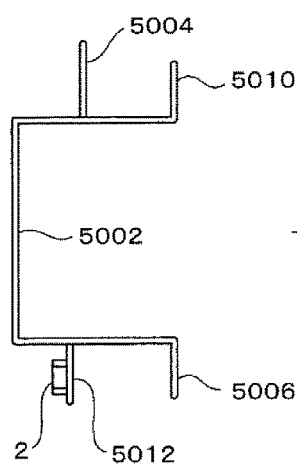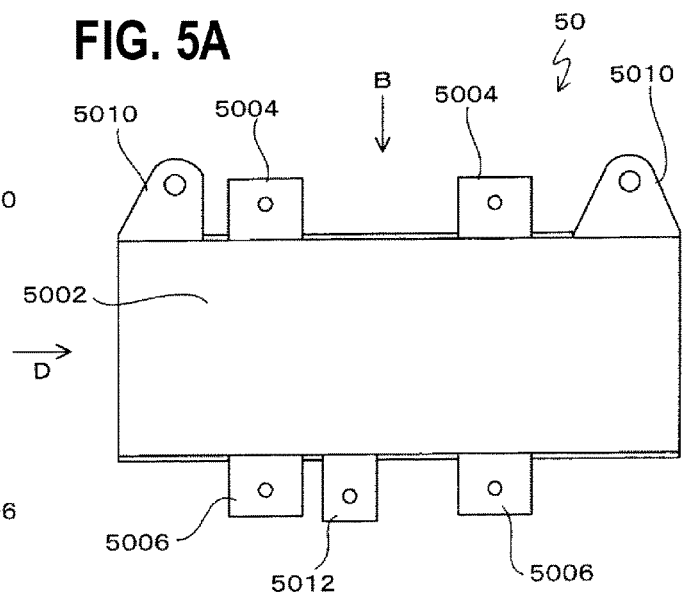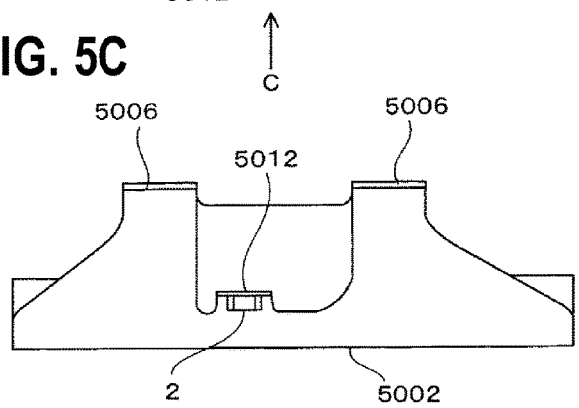

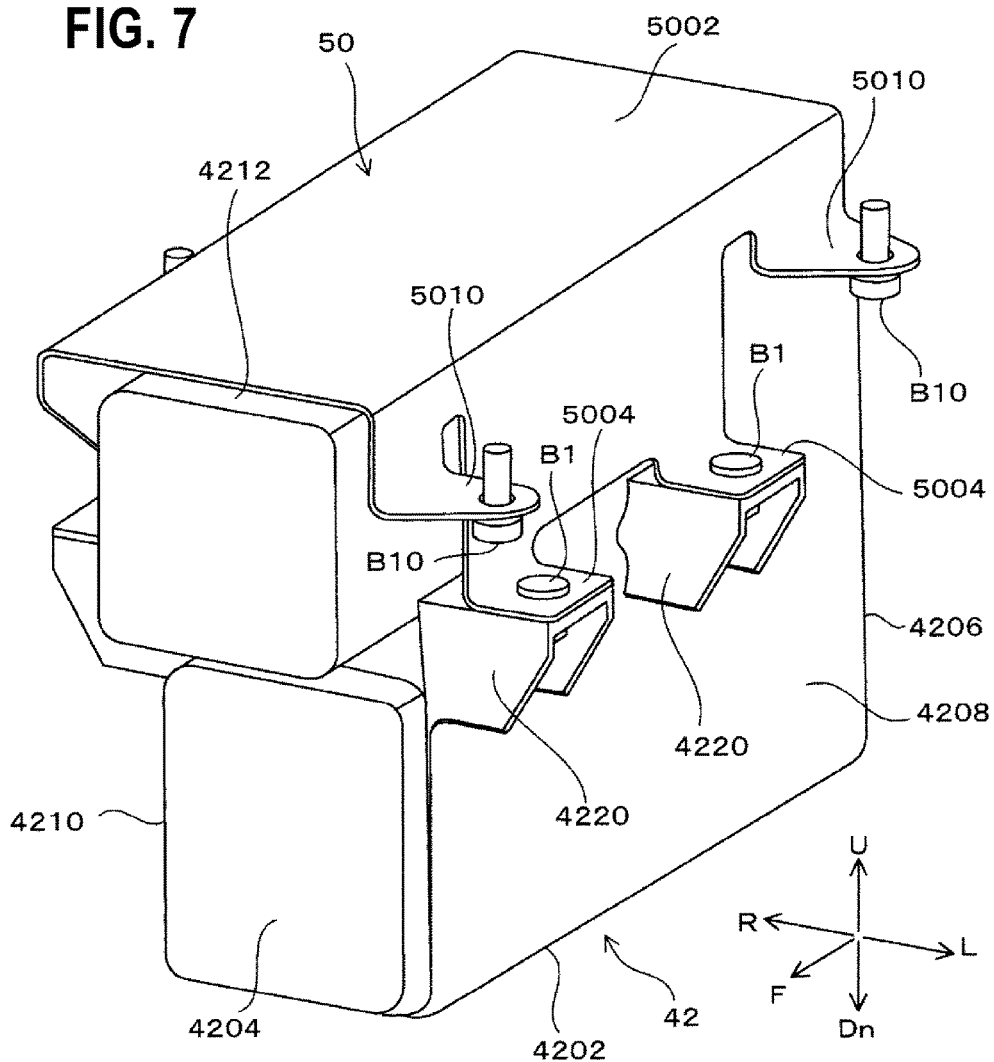

ARRANGEMENT STRUCTURE OF CANISTER IN VEHICLE

CROSS REFERENCE TO RELATED APPLICATION

This application is based on Japanese Patent Application No. 2014-216072 filed on Oct. 23, 2014, the contents of which are incorporated herein by reference.

BACKGROUND

1. Technical Field

The present invention relates to an arrangement structure of a canister in a vehicle.

2. Related Art

In a vehicle that uses an internal combustion engine as a driving source, a canister is arranged which prevents discharge of vaporized fuel gas into the air by adsorbing the vaporized fuel gas vaporized from fuel disposed inside a fuel tank.

In a vehicle for a country that strictly regulates the discharge of vaporized fuel gas into the air by the law, it is necessary to arrange a canister having a large capacity.

Generally, while there are many cases where a canister is arranged in a vehicle front space (engine room) disposed in front of a vehicle interior, it is difficult to arrange a canister having a large capacity in an engine room having a limited space.

Thus, it has been proposed to arrange a canister below a rear floor panel in which a space can be relatively easily secured (see JP-A-8-058404).

In the related art described above, the rear floor panel is connected to a rear portion of a front panel through a connection wall that upwardly rises, a fuel tank is arranged below the rear floor panel, and the canister is arranged between the rear face of the connection wall and the front face of the fuel tank.

In this way, a canister having a large capacity can be arranged.

In a hybrid vehicle using both a combustion engine and a motor as driving sources, it is necessary to house many components such as a combustion engine, a motor, a generator, an inverter, and a battery for auxiliary machines in a vehicle front space, and it is difficult to house all the components in the vehicle front space.

In such a case, the combustion engine, the motor, the generator, and the inverter need to be arranged at positions close to each other for the delivery of power and wirings, and, for this reason, it is necessary to arrange the battery for auxiliary machines on the floor panel that is a portion other than the vehicle front space.

In the related art described above, although the canister is described to be arranged between the rear face of the connection wall of the front floor panel and the front face of the fuel tank, it is not considered how to arrange the battery for auxiliary machines on the floor panel together with the canister.

The present invention is made in consideration of the above-mentioned circumstances, and an object thereof is to provide a vehicle canister and a battery for auxiliary machines in which the canister having a large capacity together with a battery for auxiliary machines can be advantageously arranged in a space below the rear floor panel.

SUMMARY OF THE INVENTION (1) According to an aspect of the invention, in a vehicle in which a muffler are arranged below a rear floor panel configuring a floor of a rear portion of a vehicle interior and on a further rear side than rear wheels in a vehicle forward/backward direction, and a battery for auxiliary machines is arranged on the further rear side than the rear wheels in the vehicle forward/backward direction and is housed in a battery housing recessed portion, a canister is arranged between the muffler and the battery for auxiliary machines in a vehicle width direction.

(2) In the arrangement structure of (1), a front face of the canister is positioned on a further rear side than a front face of the battery for auxiliary machines and a front face of the muffler in the vehicle forward/backward direction.

(3) In the arrangement structure of (1) or (2), a bottom face of the canister is positioned on an upper side than a bottom face of the battery for auxiliary machines and a bottom face of the muffler in an upward/downward direction.

(4) In the arrangement structure of any one of (1) to (3), the battery for auxiliary machines and the canister are positioned on a further rear side than the rear wheels, are positioned on a rear side of a cross member extending in the vehicle width direction, and are arranged on an inner side of a rear side member extending in the vehicle forward/backward direction in the vehicle width direction.

(5) In the arrangement structure of any one of (1) to (4), the battery for auxiliary machines is interposed between a rear side member and a reinforcing rib extending in the vehicle forward/backward direction at an inner side of the rear side member in the vehicle width direction, a battery housing recessed portion is disposed to protrude downward from the floor portion, and the canister is held in the reinforcing rib by a holding member.

BRIEF DESCRIPTION OF THE DRAWINGS

FIG. 2 is a diagram seen in the direction of arrow XX in a state in which FIG. 1 is vertically reversed.

FIG. 3 is a diagram seen in the direction of arrow YY in the state in which FIG. 1 is vertically reversed.

FIG. 4 is a diagram seen from the direction of arrow Z in the state in which FIG. 1 is vertically reversed.

FIG. 5A is a plan view of a holding tool of a canister, FIG. 5B is a diagram seen in the direction of arrow B illustrated in FIG. 5A, FIG. 5C is a diagram seen in the direction of arrow C illustrated in FIG. 5A, and FIG. 5D is a diagram seen in the direction of arrow D illustrated in FIG. 5A.

FIG. 7 is a perspective view illustrating a state in which a canister is held by a holding tool.

DESCRIPTION OF PREFERRED EMBODIMENT

Hereinafter, an embodiment of the present invention will be described with reference to the drawings.

In this embodiment, while a case will be described in which a vehicle is a hybrid vehicle using both an internal combustion engine and a motor as driving sources, the present invention is not limited to the hybrid vehicle. Thus, the present invention can be widely applied to a vehicle including a canister and a battery for auxiliary machines and can be applied also to a plug-in hybrid vehicle, a vehicle using only a combustion engine as a driving source, and the like.

Figure 1:
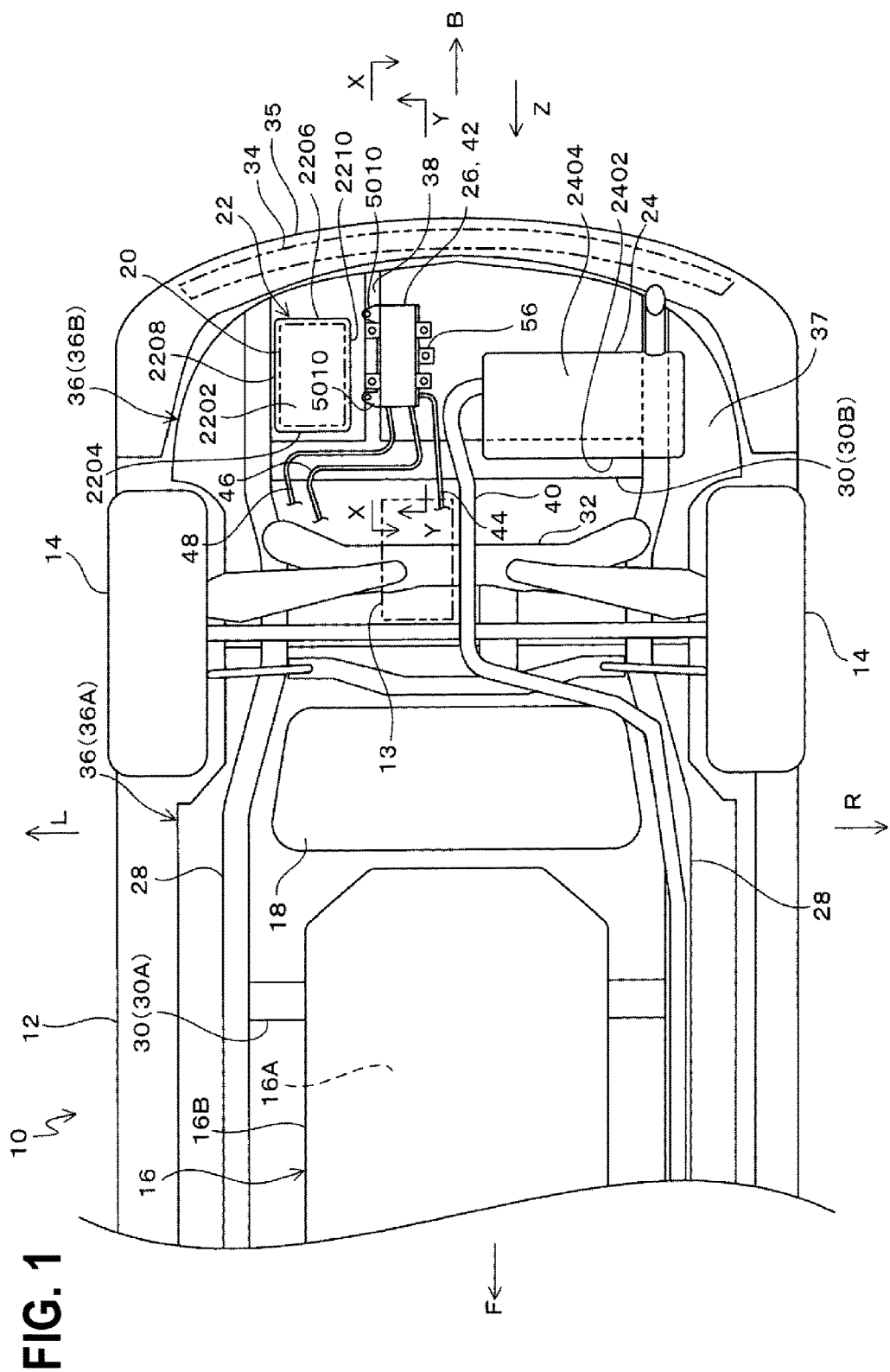
FIG. 1 is a diagram of a vehicle according to an embodiment that is seen from the lower side.

As illustrated in FIG. 1, the vehicle 10 is configured to include: a vehicle body 12; an engine not illustrated in the drawing; a front motor not illustrated in the drawing; a rear motor 13; front wheels not illustrated in the drawing; rear wheels 14; a battery 16 for traveling; a fuel tank 18; a battery 20 for auxiliary machines; a battery housing recessed portion 22; a muffler 24; and a canister 26.

In description presented here, it is assumed that the leftward/rightward directions are defined in the state of facing the front side of the vehicle 10. In the drawings, an arrow F represents the front side of the vehicle, an arrow B represents the rear side of the vehicle, an arrow L represents the left side of the vehicle, an arrow R represents the right side of the vehicle, an arrow U represents the upper side of the vehicle, and an arrow Dn represents the lower side of the vehicle.

The vehicle body 12 is configured to include: one pair of side members 28; plural cross members 30, front and rear suspension cross members 32; front and rear bumper beams 34; and a floor panel 36.

The one pair of side members 28 extend in the forward/backward direction of the vehicle with being spaced in the vehicle width direction of the vehicle 10.

The plural cross members 30 are arranged with being spaced in the forward/backward direction of the vehicle 10 and extend in the vehicle width direction to connect the one pair of side members 28.

In FIG. 1, cross members 30A and 30B respectively arranged at the center portion and the rear portion in the vehicle forward/backward direction are illustrated. In other words, the cross member 30A is arranged in front of the rear wheels 14, and the cross member 30B is arranged in the back of the rear wheels 14.

The front and rear suspension cross members 32 are arranged with being spaced in the forward/backward direction of the vehicle 10 and extend in the vehicle width direction to connect the one pair of side members 28.

Suspension devices of the front wheels and the rear wheels 14 are attached to the front and rear suspension cross members 32, and the suspension cross member 32 of the rear wheels 14 is illustrated in FIG. 1.

The suspension cross member 32 of the rear wheels 14 is positioned between the cross member 30A of the center portion and the cross member 30B of the floor portion of the rear portion in the vehicle forward/backward direction.

As illustrated in FIG. 1, the bumper beam 34 is arranged on a further rear side than the cross member 30B of the rear portion in the vehicle forward/backward direction, and the bumper beam 34 is attached to the rear ends of the one pair of side members 28 and extend in the vehicle width direction. A rear bumper 35 is illustrated.

The floor panel 36 is arranged at a lower portion of the vehicle body 12 and is configured by a steel plate. In the floor panel 36, both sides of the lower face of the floor panel 36 in the vehicle width direction are bonded to the one pair of side members 28 through welding.

The floor panel 36 is configured by a front floor panel 36A that is arranged in a front portion of the vehicle 10 and a rear floor panel 36B that is connected to the rear end of the front floor panel 36A and is arranged in a rear portion of the vehicle 10.

The rear floor panel 36B includes a floor portion 37 configuring the floor of a rear portion of the vehicle interior, and the one pair of side members 28 and the cross member 30B are arranged below the floor portion 37.

The engine and the front motor not illustrated in the drawing are arranged in the vehicle front space positioned in front of the vehicle interior, and the rear motor 13 is arranged below the floor panel 36.

The engine rotates two front wheels using power generated by burning fuel or generates power by driving a generator (not illustrated) using the power, thereby supplying the generated power to the battery 16 for traveling.

The front motor and the rear motor 13 are driven by power supplied from the battery 16 for traveling and rotate two front wheels and two rear wheels, respectively.

In the vehicle front space, the generator and an inverter (not illustrated) converting DC power supplied from the battery 16 for traveling into AC power and supplying the AC power to the front motor and the rear motor 13 are arranged.

The battery 16 for traveling supplies power to the front motor and the rear motor 13, is arranged below the front floor panel 36A, and includes a battery main body 16A and a battery case 16B that houses the battery main body 16A.

The battery main body 16A is configured to include plural battery modules connected in series and peripheral components used for causing the battery modules to exhibit the function. Each battery module includes plural battery cells connected in series.

The battery case 16B represents a rectangular plate shape in the plan view and is arranged at the center in the vehicle width direction with the longitudinal direction coinciding with the vehicle front/rear direction of the vehicle 10.

The battery case 16B is arranged between the one pair of side members 28 below the floor panel 36 and is held by the one pair side members 28 through attachment members not illustrated in the drawing.

The fuel tank 18 stores fuel and supplies the fuel to the engine and is arranged below the front floor panel 36A at a place located at the rear side of the battery 16 for traveling and in front of the suspension cross member 32 of the rear side.

The fuel tank 18 represents an elongated shape in the plan view, is arranged at the center in the vehicle width direction with the longitudinal direction coinciding with the vehicle width direction, and is held by a cross member (not illustrated) arranged between the cross members 30A and 30B through an attachment member not illustrated in the drawing.

The battery 20 for auxiliary machines supplies power to auxiliary machines mounted in the vehicle 10. Here, the auxiliary machines are devices that operate with voltages lower than the output voltage of the battery 16 for traveling and, for example, are meters installed to an instrument panel, a car navigation system, an audio system, a power window, and the like.

In the floor portion 37 of the rear floor panel 36B, the battery housing recessed portion 22 used for housing the battery 20 for auxiliary machines is disposed to protrude to the lower side.

Figure 4:
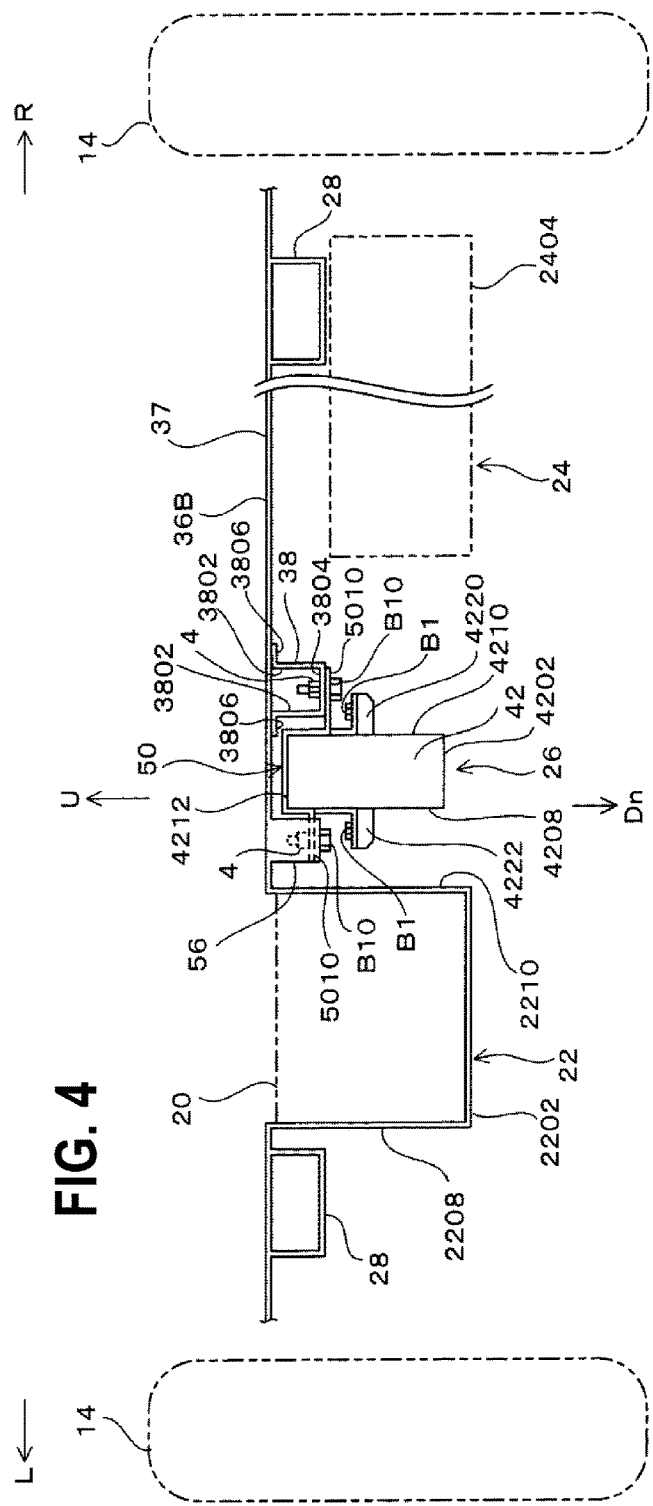

As illustrated in FIG. 4, the battery 20 for auxiliary machines is held in the battery housing recessed portion 22 by an attachment member (not illustrated) in the state of being housed in the battery housing recessed portion 22 from the vehicle interior side.

As illustrated in FIG. 1, the battery 20 for auxiliary machines represents a rectangular plate shape in the plan view and is arranged with the longitudinal direction coinciding with the vehicle forward/backward direction of the vehicle 10.

As illustrated in FIG. 4, in the state in which the battery 20 for auxiliary machines is housed in the battery housing recessed portion 22, the upper face of the battery 20 for auxiliary machines is located on the lower side of the floor portion 37.

As illustrated in FIG. 1, the battery housing recessed portion 22 is disposed in a place in the rear floor panel 36B that is close to the vehicle rear side and adjacent to the side member 28 of the left side and that is located inside the side member 28 in the vehicle width direction.

Figure 3:
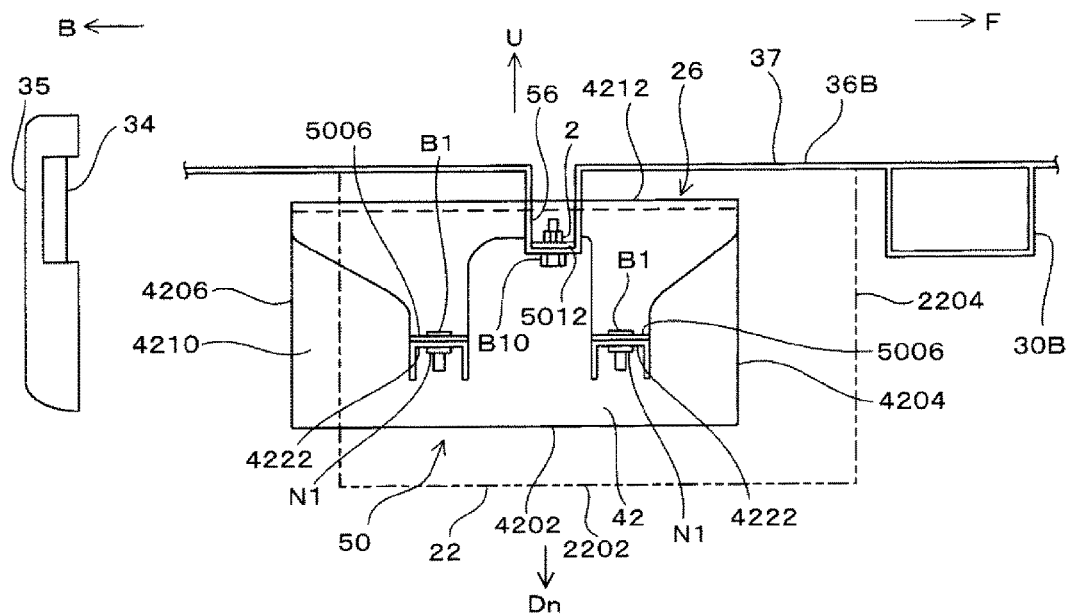

As illustrated in FIGS. 1, 3, and 4, the battery housing recessed portion 22 represents a rectangular shape larger than the contour of the battery 20 for auxiliary machines in the plan view and has a bottom face 2202 extending on the horizontal face and four side faces that rise from four sides of the bottom face 2202 and are connected to the lower face of the rear floor panel 36B.

The four side faces are configured by: a front face 2204 facing the vehicle front side; a rear face 2206 facing the vehicle rear side; a left side face 2208 facing the vehicle left side; and a right side face 2210 facing the vehicle right side.

As illustrated in FIG. 1, the cross member 30B of the rear portion approaches the front side of the battery housing recessed portion 22, one side member 28 approaches the left side of the battery housing recessed portion 22, and a reinforcing rib 38 approaches the right side of the battery housing recessed portion 22.

Figure 2:
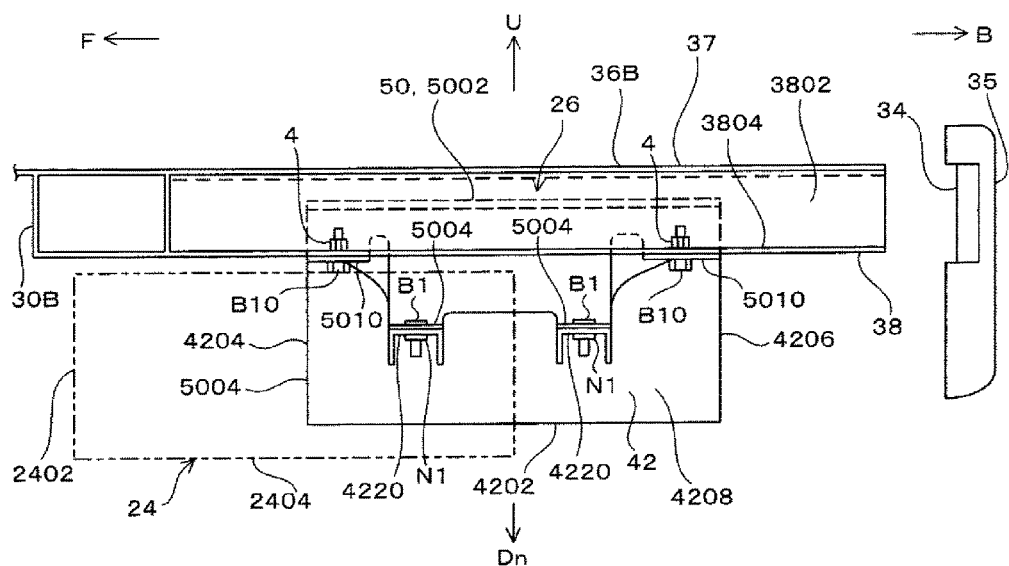

As illustrated in FIGS. 1 and 2, the reinforcing rib 38 extends along the vehicle forward/backward direction from a place disposed at the rear face of the cross member 30B of the rear portion to the rear edge of the rear floor panel 36B, and the reinforcing rib 38 faces one rear side member 28.

As illustrated in FIGS. 2 and 4, the reinforcing rib 38 is welded to the lower face of the rear floor panel 36B and includes a pair of side walls 3802 facing each other in the vehicle width direction, a bottom wall 3804 connecting the pair of side walls 3802, and flanges 3806 protruding outward from upper edges of the pair of side walls 3802.

In this way, by surrounding the battery housing recessed portion 22 with the cross member 30B of the rear portion, one side member 28, and the reinforcing rib 38, the strength of the battery housing recessed portion 22 is secured, and accordingly, the battery 20 for auxiliary machines having a weight can be strongly supported by the rear floor panel 36B.

The reinforcing rib 38, as will be described later, configures an attachment unit used for attaching a holding tool 50 of the canister 26.

As illustrated in FIG. 1, the muffler 24 reduces an exhaust noise by introducing exhaust gas thereto from the engine through an exhaust pipe 40.

The muffler 24 has a contour having a rectangular shape in the plan view and is arranged to be spaced from the battery housing recessed portion 22 in the vehicle width direction on the lower side of the floor portion 37 and the rear side of the cross member 30B of the rear portion with the longitudinal direction coinciding with the vehicle width direction and is installed to the lower face of the rear floor panel 36B through an attachment member not illustrated in the drawing.

As illustrated in FIGS. 1 and 2, the muffler 24 includes a front face 2402 facing the vehicle front side and a bottom face 2404 facing the lower side.

The canister 26 adsorbs evaporated fuel gas disposed in the fuel tank 18 and is arranged below the floor portion 37.

As illustrated in FIGS. 1 to 4, the canister 26 is configured to include: a canister main body 42; a vapor pipe 44; a purge pipe (ventilation) 46; a feed pipe 48; and a holding tool 50.

The canister main body 42 includes: a bottom face 4202 representing a rectangular shape in the plan view; four side faces rising from four sides of the bottom face 4202; and an upper face 4212 that connects the side faces and faces the bottom face 4202.

The four side faces are configured by: a front face 4204 facing the vehicle front side; a rear face 4206 facing the vehicle rear side; a left side face 4208 facing the vehicle left side; and a right side face 4210 facing the vehicle right side.

Figure 6:
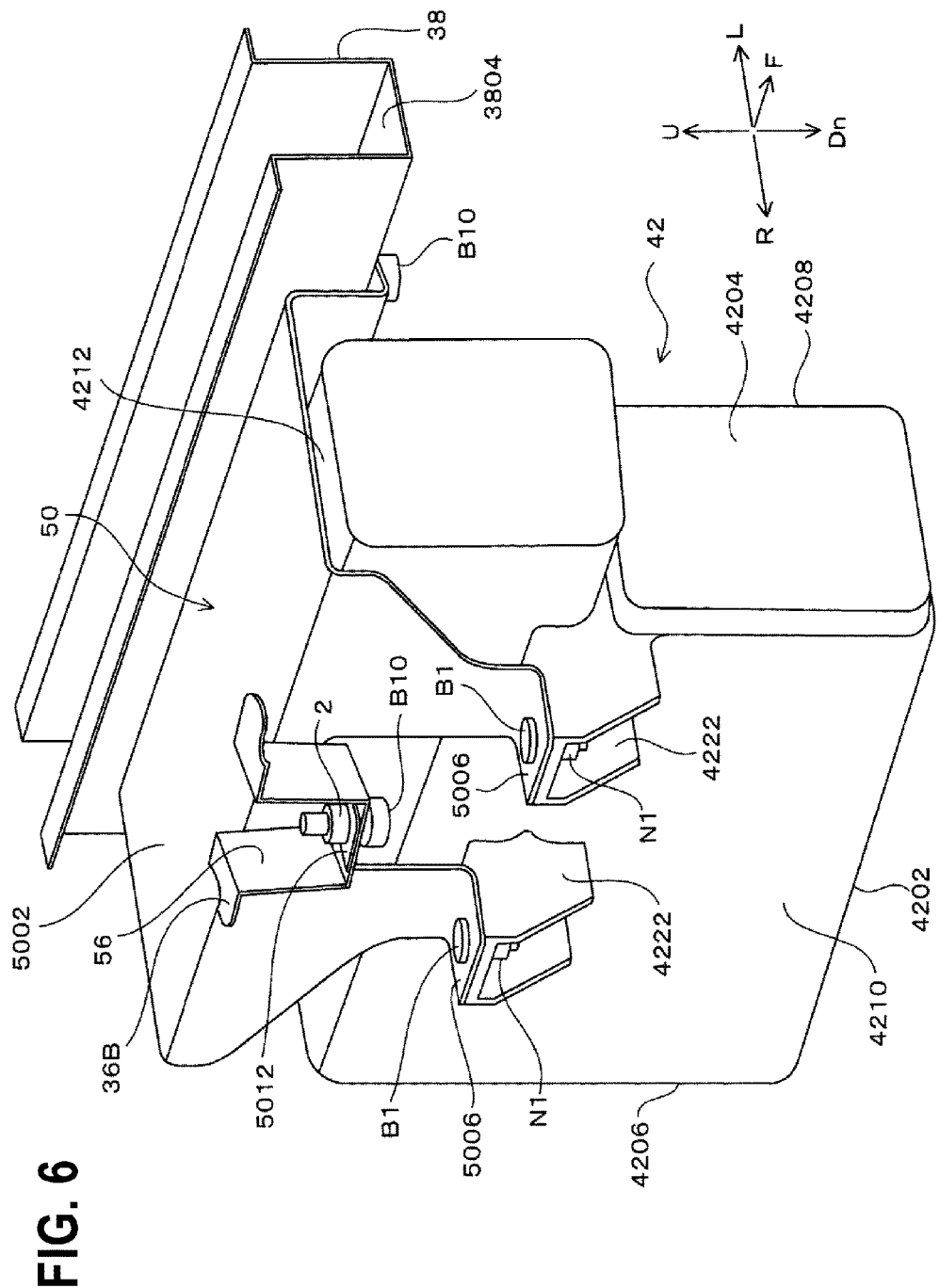
FIG. 6 is a perspective view illustrating the attached state of a canister.

As illustrated in FIGS. 6 and 7, two left attachment portions 4220 protrude on the left side face 4208 with being spaced in the forward/backward direction, and two right attachment portions 4222 protrude on the right side face 4210 with being spaced in the forward/backward direction. In each of the attachment portions 4220 and 4222, a bolt through hole is formed.

The canister main body 42 houses a fuel adsorbent that is formed using activated carbon or the like therein.

The vapor pipe 44 connects the fuel tank 18 and the canister main body 42 to each other and introduces vaporized fuel gas that is vaporized from the fuel disposed inside the fuel tank 18 into the canister main body 42 and causes the vaporized fuel gas to be adsorbed onto the fuel adsorbent.

The purge pipe 46 introduces purge air into the canister main body 42 and communicates with the air side.

The feed pipe 48 connects the canister main body 42 and the engine to each other and supplies the fuel adsorbed onto the fuel adsorbent to the engine together with the purge air introduced from the purge pipe 46 so as to be burned.

In this way, the vaporized fuel gas generated in the fuel tank 18 is adsorbed onto the fuel adsorbent, and the fuel adsorbed onto the fuel adsorbent is supplied to the engine, whereby the discharge of the vaporized fuel gas into the air is prevented.

The holding tool 50 holds the canister main body 42 and attaches the canister 26 to the rear floor panel 36B.

As illustrated in FIGS. 5A to 7, the holding tool 50 includes: an upper piece 5002, which has a rectangular shape, covering the upper face 4212 of the canister main body 42; an attachment piece used for attaching the holding tool 50 to the canister main body 42; and an attachment piece used for attaching the holding tool 50 to the rear floor panel 36B.

The attachment piece used for attaching the holding tool 50 to the canister main body 42 includes two left attachment pieces 5004 and two right attachment pieces 5006.

The attachment piece used for attaching the holding tool 50 to the rear floor panel 36B includes two left attachment pieces 5010 and one right attachment piece 5012.

In the right attachment piece 5012, a weld nut 2 is disposed.

Two left attachment pieces 5004 and two right attachment pieces 5006 are mounted on the attachment portions 4220 and 4222 of the canister 26 through a bolt B1 and a nut N1, whereby the canister main body 42 is held by the holding tool 50.

As illustrated in FIGS. 2 and 4, on the bottom wall 3804 of the reinforcing rib 38, weld nuts 4 are disposed at places corresponding to the two right attachment pieces 5006.

As illustrated in FIGS. 3 and 4, a recessed portion 56 having a sectional hat shape is formed in a place corresponding to a second attachment piece 52B on the rear floor panel 36B, and a bolt through hole is disposed at a place corresponding to the weld nut 2 of one right attachment piece 5012 on the bottom wall of the recessed portion 56. The recessed portion 56 configures an attachment portion used for attaching the holding tool 50 and serves as a reinforcing rib used for supporting the canister 26.

The two left attachment pieces 5010 and one right attachment piece 5012 are mounted in the reinforcing rib 38 and the recessed portion 56 through a bolt B10 and weld nuts 2 and 4.

In such an attached state of the canister main body 42, as illustrated in FIG. 2, the canister 26 is positioned below the floor portion 37, and an upper portion of the left side face 4208 of the canister main body 42 is covered with the reinforcing rib 38 for the outer side in the vehicle width direction.

As illustrated in FIG. 3, while the center of the upper portion of the right side face 4210 of the canister main body 42 is covered with the recessed portion 56 for the outer side in the vehicle width direction, the remaining portion is exposed.

As illustrated in FIG. 1, in the state in which the canister main body 42 is attached to the rear floor panel 36B, the longitudinal direction of the canister main body 42 coincides with the vehicle forward/backward direction.

As illustrated in FIG. 4, the bottom face 4202 of the canister 26 is positioned higher than the bottom face 2202 (the bottom face of the battery 20 for auxiliary machines) of the battery housing recessed portion 22 and the bottom face 2404 of the muffler 24.

As illustrated in FIGS. 1 to 3, the front face 4204 of the canister 26 is positioned on a further vehicle rear side than the front face 2204 (the front face of the battery 20 for auxiliary machines) of the battery housing recessed portion 22 and the front face 2402 of the muffler 24.

As illustrated in FIGS. 1 to 3, the cross member 30B of the rear portion is positioned in front of the holding tool 50, and the bumper beam 34 is positioned at the rear side of the holding tool 50.

In this embodiment, as illustrated in FIG. 1, in the state in which the canister 26 is attached to the rear floor panel 36B, the canister 26, the muffler 24, and the battery 20 for auxiliary machines are arranged on a further rear side than the rear wheels 14 in the vehicle forward/backward direction, and the canister 26 is arranged between the muffler 24 and the battery 20 for auxiliary machines in the vehicle width direction.

Accordingly, since the canister 26 is positioned between the muffler 24 and the battery 20 for auxiliary machines, stepping stones from the rear wheels 14 collide with the muffler 24 and the battery 20 for auxiliary machines so as to make it difficult to arrive at the holding tool 50 and the canister 26, and there is an advantage of improving the durability of the canister 26 by protecting the canister 26 from the stepping stones.

Accordingly, it is possible to arrange the canister 26 having a large capacity together with the battery 20 for auxiliary machines in the space below the rear floor panel 36B.

Since heat transmitted from the muffler 24 heated by the exhaust gas can be easily received by the canister 26, it is possible to improve a purge effect of the canister 26. For this reason, it is possible to suppress the required capacity of the fuel adsorbent of the canister 26 and to achieve a decrease in the size of the canister 26.

In this embodiment, as illustrated in FIGS. 2 and 3, in the vehicle forward/backward direction, the front face 4204 of the canister 26 is positioned on a further rear side than the front face 2204 (the front face of the battery 20 for auxiliary machines) of the battery housing recessed portion 22 and the front face 2402 of the muffler 24.

Thus, while the stepping stones from the rear wheels 14 arrive at the front face 2204 (the front face of the battery 20 for auxiliary machines) of the battery housing recessed portion 22 and the front face 2402 of the muffler 24, it is difficult for the stepping stones to arrive at the front face 4204 of the canister 26. Accordingly, it is possible to protect the canister 26 from the stepping stones and thus to improve the durability of the canister 26.

In this embodiment, as illustrated in FIG. 4, in the upward/downward direction, the bottom face 4202 of the canister 26 is positioned on a further upper side than the bottom face 2202 (the bottom face of the battery 20 for auxiliary machines) of the battery housing recessed portion 22 and the bottom face 2404 of the muffler 24.

Thus, while the stepping stones from the rear wheels 14 arrive at the bottom face 2202 (the bottom face of the battery 20 for auxiliary machines) of the battery housing recessed portion 22 and the bottom face 2404 of the muffler 24, it is difficult for the stepping stones to arrive at the bottom face 4202 of the canister 26. Accordingly, it is possible to further protect the canister 26 from the stepping stones and thus to further improve the durability of the canister 26.

In this embodiment, as illustrated in FIGS. 1 and 4, the battery 20 for auxiliary machines, the canister 26, and the muffler 24 are positioned on a further rear side than the cross member 30B that is positioned on a further rear side than the rear wheels 14 and extends in the vehicle width direction and are arranged on the inner side of the rear side member 28, which extends in the vehicle forward/backward direction, in the vehicle width direction.

Accordingly, since a shock caused by a collision can be prevented by using the cross member 30B and the rear side member 28, it is possible to further improve the durability of the canister 26.

In this embodiment, as illustrated in FIGS. 1 and 4, the battery 20 for auxiliary machines is arranged in the battery housing recessed portion 22 that is interposed between the rear side member 28 and the reinforcing rib 38 extending in the vehicle forward/backward direction inside the rear side member 28 in the vehicle width direction and that is disposed to protrude downward from the floor portion 37, and the canister 26 is held in the reinforcing rib 38 by the holding tool 50.

Thus, since the stepping stones from the rear wheels 14 indirectly collide with the battery 20 for auxiliary machines through the battery housing recessed portion 22, a shock participating to the battery 20 for auxiliary machines is relieved. Accordingly, it is possible to further protect the battery 20 for auxiliary machines from the stepping stones and thus to further improve the durability of the battery 20 for auxiliary machines and the canister 26.

By surrounding the battery housing recessed portion 22 with the rear side member 28 and the reinforcing rib 38, it is possible to secure the strength of the battery housing recessed portion 22 and thus to strongly support the battery 20 for auxiliary machines having a weight using the rear floor panel 36B.

Since the canister 26 is held in the reinforcing rib 38 by the holding tool 50, it is possible to increase the attachment strength of the canister 26 for the rear floor panel 36B and thus to protect the canister 26 from a damage occurring at the time of a collision of the vehicle. Accordingly, it is possible to improve the durability of the canister 26.

In this embodiment, as illustrated in FIGS. 1 to 3, since the bumper beam 34 is arranged on the rear side of the canister 26, the canister 26 is protected by the bumper beam 34 in a case where a collision of the vehicle 10 occurs from the rear side.

Thus, since the canister 26 can be protected without arranging a special protector member used for protecting the canister 26, it is possible to improve the durability of the canister 26.

In n this embodiment, since the canister 26 is attached to the reinforcing rib 38 that is used for reinforcing the battery housing recessed portion 22, it is possible to improve the attachment strength of the canister 26 to the rear floor panel 36B and thus to protect the canister 26 from a body damage at the time of collision of the vehicle 10. As a result, it is possible to improve the durability of the canister 26.

In this embodiment, the battery 16 for traveling is arranged below the front floor panel 36A, and the fuel tank 18 is arranged below the front floor panel 36A at a place positioned on the rear side of the battery 16 for traveling and on the front side of the suspension cross member 32 of the rear side.

Accordingly, while the canister 26 having a large capacity is arranged together with the battery 20 for auxiliary machines in the space below the floor portion 37 of the rear floor panel 36B, both the battery 16 for traveling and the fuel tank 18 are arranged by using a space positioned below the front floor panel 36A. Accordingly, it is possible to secure the capacities of the battery 16 for traveling and the fuel tank 18.

According to an aspect of the present invention, since the canister is positioned between the muffler and the battery for auxiliary machines, stepping stones from the rear wheels collide with the muffler and the battery housing recessed portion so as to make it difficult to arrive at the canister. Accordingly, it is possible to protect the canister from the stepping stones and thus to improve the durability of the canister.

Accordingly, it is possible to arrange the canister having a large capacity together with the battery for auxiliary machines in the space below the rear floor panel.

Since heat transmitted from the muffler can be easily received by the canister, it is possible to improve the purge effect of the canister.

While stepping stones from the rear wheels arrive at the front face of the battery for auxiliary machines and the front face of the muffler, it is difficult for the stepping stones to arrive at the front face of the canister. Accordingly, it is possible to further protect the canister from the stepping stones and thus to improve the durability of the canister.

Stepping stones from the rear wheels arrive at the bottom face of the battery for auxiliary machines and the bottom face of the muffler, it is difficult for the stepping stones to arrive at the bottom face of the canister. Accordingly, it is possible to further protect the canister from the stepping stones and thus to improve the durability of the canister.

By protecting the canister from a shock caused by a collision using the cross member and the rear side member, it is possible to further improve the durability of the canister.

Since stepping stones from the rear wheels indirectly collide with the battery for auxiliary machines through the battery housing recessed portion, it is possible to further protect the battery for auxiliary machines from the stepping stones and thus to improve the durability of the battery for auxiliary machines and the canister.

By surrounding the battery housing recessed portion with the rear side member and the reinforcing rib, it is possible to secure the strength of the battery housing recessed portion and to strongly support the battery for auxiliary machines having a weight using the rear floor panel.

Since the canister is held in the reinforcing rib, it is possible to increase the attachment strength of the canister to the rear floor panel and to further protect the canister from a damage occurring at the time of collision of the vehicle. As a result, it is possible to improve the durability of the canister.

What is claimed is:

1. An arrangement structure of a canister in a vehicle in which:
    a muffler is arranged below a rear floor panel configuring a floor of a rear portion of a vehicle interior and on a further rear side than rear wheels in a vehicle forward/backward direction;
    a battery for auxiliary machines is arranged on the further rear side than the rear wheels in the vehicle forward/backward direction and is housed in a battery housing recessed portion; and
    the canister is arranged below the rear floor panel in a protected position between the muffler and the battery for auxiliary machines in a vehicle width direction,
    wherein the battery housing and the canister are positioned further toward the rear of the vehicle than the rear wheels, and are positioned to the rear of a cross member extending in the vehicle width direction, and are arranged in a vehicle width direction on an inner side of a rear side member that extends in the vehicle forward/backward direction.

2. The arrangement structure of the canister according to claim 1, wherein a front face of the canister is positioned on a further rear side than a front face of the battery for auxiliary machines and a front face of the muffler in the vehicle forward/backward direction.

3. The arrangement structure of the canister according to claim 2, wherein a bottom face of the canister is positioned on an upper side than a bottom face of the battery for auxiliary machines and a bottom face of the muffler in an upward/downward direction.

4. The arrangement structure of the canister according to claim 3, wherein the battery for auxiliary machines and the canister are positioned on a further rear side than the rear wheels, are positioned on a rear side of a cross member extending in the vehicle width direction, and are arranged on an inner side of a rear side member extending in the vehicle forward/backward direction in the vehicle width direction.

5. The arrangement structure of the canister according to claim 4, wherein the battery for auxiliary machines is interposed between a rear side member and a reinforcing rib extending in the vehicle forward/backward direction at an inner side of the rear side member in the vehicle width direction,
    a battery housing recessed portion is disposed to protrude downward from the floor portion, and
    the canister is held in the reinforcing rib by a holding member.

6. The arrangement structure of the canister according to claim 3, wherein the battery for auxiliary machines is interposed between a rear side member and a reinforcing rib extending in the vehicle forward/backward direction at an inner side of the rear side member in the vehicle width direction,
    a battery housing recessed portion is disposed to protrude downward from the floor portion, and
    the canister is held in the reinforcing rib by a holding member.

7. The arrangement structure of the canister according to claim 2, wherein the battery for auxiliary machines and the canister are positioned on a further rear side than the rear wheels, are positioned on a rear side of a cross member extending in the vehicle width direction, and are arranged on an inner side of a rear side member extending in the vehicle forward/backward direction in the vehicle width direction.

8. The arrangement structure of the canister according to claim 7, wherein the battery for auxiliary machines is interposed between a rear side member and a reinforcing rib extending in the vehicle forward/backward direction at an inner side of the rear side member in the vehicle width direction,
 a battery housing recessed portion is disposed to protrude downward from the floor portion, and
  the canister is held in the reinforcing rib by a holding member.

9. The arrangement structure of the canister according to claim 2, wherein the battery for auxiliary machines is interposed between a rear side member and a reinforcing rib extending in the vehicle forward/backward direction at an inner side of the rear side member in the vehicle width direction,
 a battery housing recessed portion is disposed to protrude downward from the floor portion, and
  the canister is held in the reinforcing rib by a holding member.

10. The arrangement structure of the canister according to claim 1, wherein a bottom face of the canister is positioned on an upper side than a bottom face of the battery for auxiliary machines and a bottom face of the muffler in an upward/downward direction.

11. The arrangement structure of the canister according to claim 10, wherein the battery for auxiliary machines and the canister are positioned on a further rear side than the rear wheels, are positioned on a rear side of a cross member extending in the vehicle width direction, and are arranged on an inner side of a rear side member extending in the vehicle forward/backward direction in the vehicle width direction.

12. The arrangement structure of the canister according to claim 11, wherein the battery for auxiliary machines is interposed between a rear side member and a reinforcing rib extending in the vehicle forward/backward direction at an inner side of the rear side member in the vehicle width direction,
 a battery housing recessed portion is disposed to protrude downward from the floor portion, and
  the canister is held in the reinforcing rib by a holding member.

13. The arrangement structure of the canister according to claim 10, wherein the battery for auxiliary machines is interposed between a rear side member and a reinforcing rib extending in the vehicle forward/backward direction at an inner side of the rear side member in the vehicle width direction,
 a battery housing recessed portion is disposed to protrude downward from the floor portion, and
  the canister is held in the reinforcing rib by a holding member.

14. The arrangement structure of the canister according to claim 1, wherein the battery housing is interposed in the vehicle width direction between a rear side member and a reinforcing rib extending in the vehicle forward/backward direction,
 a battery housing recessed portion is disposed to protrude downward from the floor portion, and
  the canister is held to the reinforcing rib by a holding member.

15. The arrangement structure of the canister according to claim 1, wherein the battery housing is interposed in the vehicle width direction between a rear side member and a reinforcing rib extending in the vehicle forward/backward direction,
 a battery housing recessed portion is disposed to protrude downward from the floor portion, and
  the canister is held to the reinforcing rib by a holding member.

16. An arrangement structure of a canister in a vehicle in which:
 a muffler is arranged below a rear floor panel configuring a floor of a rear portion of a vehicle interior and further toward the rear of the vehicle than the rear wheels of the vehicle in a forward/backward direction;
 a battery for auxiliary machines is housed in a battery housing recessed portion arranged further to the rear of the vehicle than the rear wheels of the vehicle; and
 the canister is arranged between the muffler and the battery housing in a vehicle width direction; wherein
 the battery housing and the canister are positioned further toward the rear of the vehicle than the rear wheels, and are positioned to the rear of a cross member extending in the vehicle width direction, and are arranged in a vehicle width direction on an inner side of a rear side member that extends in the vehicle forward/backward direction.

17. An arrangement structure of a canister in a vehicle in which:
 a muffler is arranged below a rear floor panel configuring a floor of a rear portion of a vehicle interior and further toward the rear of the vehicle than the rear wheels of the vehicle in a forward/backward direction;
 a battery for auxiliary machines is housed in a battery housing recessed portion arranged further to the rear of the vehicle than the rear wheels of the vehicle; and
 the canister is arranged between the muffler and the battery housing in a vehicle width direction; wherein
 the battery housing is interposed in the vehicle width direction between a rear side member and a reinforcing rib extending in the vehicle forward/backward direction,
 a battery housing recessed portion is disposed to protrude downward from the floor portion, and
  the canister is held to the reinforcing rib by a holding member.

* * * * *